United States Patent
Bloch et al.

[11] Patent Number: 5,962,099
[45] Date of Patent: Oct. 5, 1999

[54] PRESSURE-SENSITIVE PAPER-PLASTIC FILM LAMINATE TAPE

[76] Inventors: Gilbert Bloch, 3349 St. Malo Ct., Palm Beach Gardens, Fla. 33410; Arnold B. Finestone, 2400 Presidential Way, West Palm Beach, Fla. 33401; Gerald Bloch, 21 E. 87 St., New York, N.Y. 10128

[21] Appl. No.: 08/209,405

[22] Filed: Mar. 14, 1994

Related U.S. Application Data

[63] Continuation-in-part of application No. 07/975,080, Nov. 12, 1992, abandoned.

[51] Int. Cl.$^6$ ..................................................... B32B 27/10
[52] U.S. Cl. ..................... 428/41.4; 428/41.8; 428/214; 428/215; 428/352; 428/354; 428/906
[58] Field of Search ........................... 428/40, 42, 343, 428/354, 355, 507, 511, 512, 41.4, 41.8, 214, 215, 352, 906

[56] References Cited

U.S. PATENT DOCUMENTS

| | | | |
|---|---|---|---|
| 2,444,830 | 7/1948 | Kellgren et al. | 428/354 |
| 2,463,244 | 3/1949 | Carter | 428/354 |
| 3,368,323 | 2/1968 | Wood | 100/2 |
| 3,632,386 | 1/1972 | Hurst | 117/46 FC |
| 4,041,202 | 8/1977 | Williams | 428/138 |
| 4,096,013 | 6/1978 | Lutzmann et al. | 428/350 |
| 4,351,877 | 9/1982 | Williams | 126/272 |
| 4,557,971 | 12/1985 | Wiliams | 428/343 |
| 4,801,487 | 1/1989 | Kalus et al. | 428/206 |
| 4,895,747 | 1/1990 | Birkholz et al. | 428/42 |
| 5,190,798 | 3/1993 | Bloch | 428/40 |

*Primary Examiner*—Blaine Copenheaver
*Attorney, Agent, or Firm*—Pennie & Edmonds LLP

[57] ABSTRACT

A pressure-sensitive tape for sealing cartons and for other applications requiring a flexible tape of exceptional strength and of sufficient body so that the tape in roll form may be dispensed from a conventional pull-and-tear tape dispenser. The tape is composed of a paper-plastic film laminate having a first ply of biaxially-oriented, synthetic-plastic film, cold-laminated by a water-based adhesive to a second ply formed of paper. The inner surface of the film ply is corona-discharge treated to render it wettable and receptive to the adhesive, thereby producing a strong adhesive bond to the paper ply that is resistant to delamination of the tape. One side of the laminate which may be either the paper or the film side, is coated with a pressure-sensitive adhesive, whereas the other side is coated with a silicone release agent to prevent blocking, whereby the tape may be wound into a roll for loading a tape dispenser.

8 Claims, 1 Drawing Sheet

PRESSURE-SENSITIVE PAPER-PLASTIC FILM LAMINATE TAPE

RELATED APPLICATIONS

This application is a continuation-in-part of the Block et al. application Ser. No. 07/975,080, filed Nov. 12, 1992, now abandoned, entitled "PAPER-FILM LAMINATE SEALING TAPE" whose entire disclosure and that of the related application Ser. No. 07/818,543, filed Jan. 9, 1992, now U.S. Pat. No. 5,190,798, are incorporated herein by reference.

BACKGROUND OF INVENTION

1. Field of Invention

This invention relates generally to pressure-sensitive sealing tapes, and more particularly to a paper-plastic film laminate tape of exceptional strength and sufficient body to enable the tape to be dispensed in a conventional tape dispenser machine.

2. Status of Prior Art

The patent to Williams U.S. Pat. No. 4,351,877 discloses a sealing tape for cartons, formed of a high-strength face ply of synthetic plastic film material, laminated to a base ply of paper whose outer surface is coated with a remoistenable adhesive. This tape is wound into a roll and is dispensed from a standard Kraft paper tape-dispensing machine which includes a water reservoir to moisten the adhesive coating as the tape is advanced out of the dispenser.

As pointed out in the Williams patent, though a sealing tape formed from a thin film of synthetic plastic material is much stronger than a Kraft paper tape, particularly if the film tape is stretch-oriented, a roll of such film tape cannot be dispensed in a Kraft paper tape-dispensing machine.

The reason for this is that the machine relies on the longitudinal stiffness of the paper tape to unwind it from the roll and force it through the outlet of the dispenser where the tape is cut to a desired length. A thin plastic film is unable to be dispensed lengthwise from a Kraft paper or a similar dispenser machine because the flexible plastic film tape is inherently flabby and lacks sufficient rigidity or stiffness for this purpose.

In order, therefore, to add sufficient rigidity to the tape so that it can be properly dispensed, Williams laminates a paper ply to the plastic film ply. To effect lamination of the paper ply to the plastic ply, Williams uses a conventional glue for this purpose. Should this glue be a hot melt adhesive of the type ordinarily used to laminate paper to film, the resultant heat would impair the orientation and strength of the film.

Our above-identified co-pending application Ser. No. 07/975,080 discloses a paper-film laminate sealing tape having a base ply of oriented film, cold-laminated by a water-based adhesive to a paper face ply so that its orientation is maintained, the exposed surface of the film base ply being coated with a remoistenable adhesive. The present invention resides in a pressure-sensitive paper-plastic film laminate tape which is applied to a surface to be sealed by pressure as distinguished from a tape, as in Williams, and in our copending application in which the adhesive layer is remoistenable.

SUMMARY OF INVENTION

In view of the foregoing, the main object of this invention is to provide a paper-plastic film laminate pressure-sensitive sealing tape of exceptional strength and of sufficient body to enable the tape to be dispensed in a conventional pull-and-tear tape dispenser.

More particularly an object of the invention is to provide a tape of the above type in which a plastic film ply biaxially-oriented to impart high-strength thereto, is cold laminated to the paper ply by a water-based adhesive so, that lamination is effected without heat that would impair the orientation and strength of the plastic film ply.

A significant feature of a tape in accordance with the invention is that it is highly-resistant to delamination and when stripped from a carton or other article, it is removed therefrom in toto.

Briefly stated, these objects are attained in a pressure-sensitive tape for sealing cartons and for other applications requiring a flexible tape of exceptional strength and of sufficient body so that the tape in roll form may be dispensed from a conventional pull-and-tear tape dispenser.

The tape is composed of a paper-plastic film laminate having a first ply of biaxially-oriented, synthetic-plastic film, cold-laminated by a water-based adhesive to a second ply formed of paper. The inner surface of the film ply is corona-discharge treated to render it wettable and receptive to the adhesive, thereby producing a strong adhesive bond to the paper ply that is resistant to delamination of the tape. One side of the laminate which may be either the paper or the film side, is coated with a pressure-sensitive adhesive, whereas the other side of the film laminate face is coated with a silicone release agent to prevent blocking whereby the tape may be wound into a roll for loading a tape dispenser.

BRIEF DESCRIPTION OF DRAWINGS

For a better understanding of the invention as well as other objects and features thereof, reference is made to the detailed description of the invention and the accompanying drawing wherein.

DESCRIPTION OF INVENTION

Figure 1:
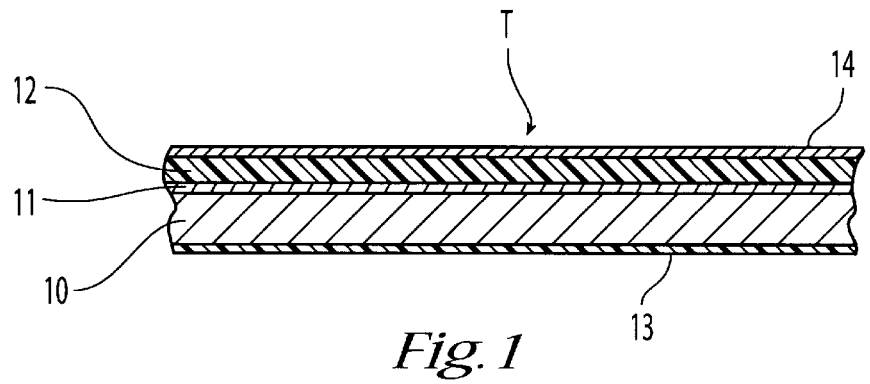
FIG. 1 is a section taken through a preferred embodiment of a sealing tape in accordance with the invention, the scale of the tape being magnified.
Figure 2:
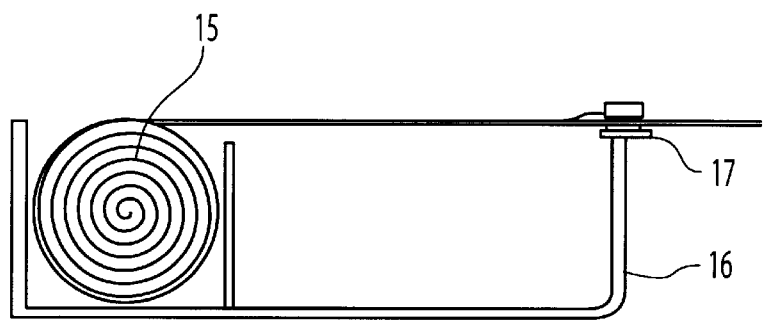
FIG. 2 shows the tape in roll form loaded into a tape dispenser.

The Tape:

Referring now to FIGS. 1 and 2, one preferred embodiment of a sealing tape T in accordance with the invention includes a base ply 10 formed of Kraft or other paper sheeting. Base ply 10 is cold laminated by an adhesive layer 11 to a film ply 12 of high-strength, synthetic plastic film, such as polyethylene. Preferably the film is formed of a biaxially-oriented material, such as polypropylene or polyester (MYLAR). The inner surface of film ply 12 is rendered wettable by a corona-discharge treatment to enhance the energy at this surface so that it is receptive to adhesives.

Coated on the exposed surface of paper base ply 10 is a pressure-sensitive adhesive layer 13, so that the sealing tape can be adhered to a carton, a package or other article. The pressure-sensitive layer 13 may be any suitable pressure-sensitive adhesive, such as rubber, vinyl rubber, polyvinylether, polyvinylbutyral, polyisobutylene or acrylic. The tape acts to close the flaps or joints of the carton or to carry out any other conventional sealing function.

The plastic film face ply 12 is no greater than mils in thickness and is preferably about one mil in thickness; hence, by itself, it lacks rigidity and body. The Kraft paper base ply 10 is thicker, preferably being 2 or 3 mils thick, but no greater than about 6 mills, thereby imparting a measure of stiffness and body to the tape.

When film ply 12 is biaxially-oriented, it has exceptional tensile strength, such orientation being effected by stretching the film along both its transverse and horizontal axes to molecularly orient the film structure. The strength of the thicker paper base ply 10, per se, is not high, but the paper-film laminate has both body and high strength, so that a roll of the tape can be used in a conventional pull-and-tear tape dispenser.

Cold lamination of the plies is effected by a water-based adhesive, preferably a polyacrylic copolymer composition having an affinity both for the paper ply and the film ply. Because the water-based adhesive is fluid at ambient temperature and is not a hot melt adhesive; no heat is applied to the biaxially-oriented film as it is being laminated to the paper ply. A water-based adhesive, once cured, is not water soluble and is not remoistenable.

It is important to bear in mind that a biaxially-oriented film is heat-sensitive and that at elevated temperatures, the film relaxes and loses its molecular orientation and strength. It is known, for example, that when two sheets of biaxially-oriented polyester film are seamed together, using an ultrasonically-activated sealing bar for this purpose which creates internal friction and heat within the film, this causes the superposed films to soften and fuse. The resultant sealing line is weak, and the sheets then tend to tear along this line. Cold lamination is therefore essential to the present invention in order to produce a tape paper-film laminate of high strength.

It is to be noted that a synthetic plastic film material, such as polypropylene, is normally not receptive to adhesives, especially water-based adhesives. Hence if one were to apply to the surface of this film a water-based adhesive which is flowable at ambient temperature or at a temperature somewhat above ambient but not at the elevated temperature of a hot melt adhesive, the adhesive will not be adsorbed by the film.

Essential to the invention is that the inner surface of the film forming the face ply of the tape be treated so as to render it wettable and hence receptive to adhesives. To this end, this surface is subjected to a corona discharge treatment which enhances the surface energy, as measured in dynes, and thereby renders the surface wettable to allow for better bonding of the adhesive applied thereto. The resultant bond both to the film and the paper is so strong that the tape is highly resistant to delamination.

It is important that the film surface be subjected to corona-discharge treatment shortly before adhesive is applied thereto, for the effect of such treatment has a relatively short duration. Thus if after such treatment, the film is stored for several days or longer before being converted into a tape, the wettability of the film surface will be greatly diminished.

Because of the pressure-sensitive adhesive layer 13 which coats the outer surface of the paper base ply 10, should the tape be coiled to form a roll, the convolutions of the roll would stick together, giving rise to what is called "blocking," so that one could not then unwind the roll. To prevent such blocking, the outer surface of film face ply 12 is coated with a silicone or other release agent 14 of the type commonly used in "Scotch" brand and other pressure-sensitive plastic film tapes which come in roll form.

The resultant roll 15, shown in FIG. 2 is loaded into a pull-and-tear tape dispenser 16 suitable for a pressure-sensitive tape, the dispenser, including a cutting blade 17 at its outlet. Thus the tape drawn from roll 15 is extended through the outlet, and a desired length thereof cut off by blade 17.

Figure 3:
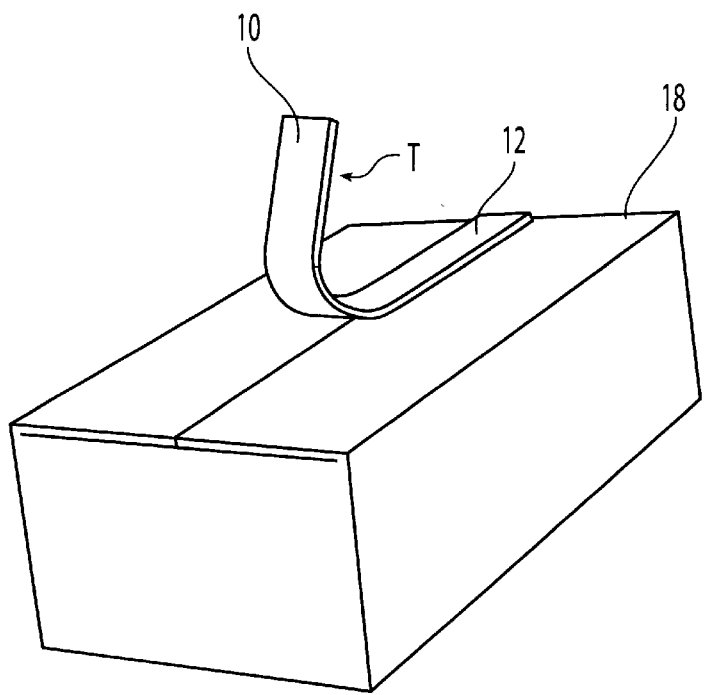
FIG. 3 shows the tape being stripped off a carton.

FIG. 3 shows a corrugated board carton 18 having complementary flaps which are sealed by a paper-plastic film laminate type T in accordance with the invention. When tape T is so applied, its paper-base ply 10 is adhered by the pressure-sensitive adhesive layer thereon to the flaps of the carton to close the carton. The strength of the adhesive bond between the plastic film ply and paper ply of the tape is greater than the pressure-sensitive adhesive bond between the paper ply 10 and the flap of the carton. In order to later open the carton, one strips off tape T in toto. This action causes surface fibers on the cardboard flaps to be ripped off and to adhere to the pressure-sensitive adhesive layer. But no part of the tape remains on the carton; hence the carton can be recycled in a paper recycling facility.

The outer surface of the plastic film ply may be metallized as by vacuum deposition to provide a decorative sealing tape. And if the nature of the synthetic plastic material forming the plastic ply is such that it has inherent release characteristics and therefore does not require coating with a release agent, the outer surface of this ply may be corona-discharge treated to render it receptive to printing inks, so that this surface may be decoratively or otherwise printed.

Also in practice, the pressure-sensitive adhesive coating may be applied to the plastic film side of the laminate instead of the paper side, as previously disclosed, in which case the release agent for preventing blocking is applied to the paper side of the laminate. And in this second embodiment of the tape, since the pressure-sensitive adhesive is coated on the exposed side of the film ply, the surface of this ply must first be corona-discharge treated to render it receptive to the adhesive.

In manufacturing a tape in accordance with the invention, a laminate of the type disclosed in our copending application may be used to corona-discharge treat a plastic web before it is adhered to a paper web to produce a paper film laminate web. This laminate web is then slit into tapes of the desired width.

While there has been disclosed preferred embodiments of the invention, in practice, many changes may be made in the tape without departing from the spirit of the invention. Thus one may make a three-ply pressure sensitive tape whose core is an oriented film cold-laminated on both sides to paper plies by a water-based adhesive a pressure sensitive adhesive coating one paper ply, the other paper ply being reserved for printing.

We claim:

1. A pressure-sensitive sealing tape of exceptional strength and of sufficient body so that it may be dispensed from a conventional pull-and-tear tape dispenser; said tape consisting essentially of:

A. a thin, biaxially oriented, synthetic-plastic film ply of high strength whose inner surface is corona-discharge treated to render it receptive to an adhesive, said film ply being formed of a material selected from a class consisting of polypropylene, polyethylene and polyester;

B. a paper ply cold laminated by a water-based adhesive to the inner surface of the film ply to form a laminate highly resistant to delamination in which the orientation of the film ply and its strength are maintained, said paper ply being relatively thick to impart stiffness and body to the tape;

C. a layer of pressure-sensitive adhesive coating one side of the laminate; and

D. a release agent coating the other side of the laminate to prevent blocking and thereby permit winding the tape into a roll useable in said dispenser.

2. A tape as set forth in claim 1, in which said film ply has a thickness no greater than three mils, and the paper ply has a thickness no greater than six mils.

3. A tape as set forth in claim 1, in which the film ply has a thickness of about one mil and the paper ply a thickness of about three mils.

4. A tape as set forth in claim 1, in which the release agent is a silicone.

5. A tape as set forth in claim 1, in which the pressure-sensitive adhesive is applied to the film side of the laminate.

6. A tape as set forth in claim 1, in which the pressure-sensitive adhesive is applied to the paper side of the laminate.

7. A tape as set forth in claim 1, in which the exposed surface of the film ply is corona-discharge treated to render it receptive to printing inks.

8. A tape as set forth in claim 1, in which the other side of the laminate is metallized.

* * * * *